US012645593B2

(12) United States Patent
Shifer et al.

(10) Patent No.: US 12,645,593 B2
(45) Date of Patent: Jun. 2, 2026

(54) APPARATUS AND METHOD FOR EFFICIENT MANAGEMENT OF MULTI-LEVEL MEMORY

(71) Applicant: Intel Corporation, Santa Clara, CA (US)

(72) Inventors: Eran Shifer, Tel Aviv (IL); Zeshan A. Chishti, Hillsboro, OR (US); Sanjay K. Kumar, Hillsboro, OR (US); Zvika Greenfield, Kfar Sava (IL); Philip Lantz, Cornelius, OR (US); Eshel Serlin, Hod Hasharon (IL); Asaf Rubinstein, Kefar Sava (IL); Robert J. Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 16/833,337

(22) Filed: Mar. 27, 2020

(65) Prior Publication Data

US 2020/0226066 A1 Jul. 16, 2020

(51) Int. Cl.
 *G06F 12/08*   (2016.01)
 *G06F 1/30*    (2006.01)
   (Continued)

(52) U.S. Cl.
 CPC ............ *G06F 12/0811* (2013.01); *G06F 1/30* (2013.01); *G06F 11/3037* (2013.01);
   (Continued)

(58) Field of Classification Search
 CPC .... G06F 12/0811; G06F 1/30; G06F 11/3037; G06F 12/0292; G06F 12/0882;
   (Continued)

(56) References Cited

U.S. PATENT DOCUMENTS 9,600,416 B2  3/2017  Ramanujan et al.
2007/0234003 A1  10/2007  Naruse
   (Continued)

FOREIGN PATENT DOCUMENTS

WO   2013095404 A1  6/2013

OTHER PUBLICATIONS

Extended European Search Report for Patent Application No. 20216709.4-1203, Mailed Jun. 29, 2021, 13 pages.

(Continued)

*Primary Examiner* — Hua J Song
(74) *Attorney, Agent, or Firm* — Compass IP Law PC

(57) ABSTRACT

An apparatus is described. The apparatus includes a memory controller to interface with a multi-level memory having a near memory and a far memory. The memory controller to maintain first and second caches. The first cache to cache pages recently accessed from the far memory. The second cache to cache addresses of pages recently accessed from the far memory. The second cache having a first level and a second level. The first level to cache addresses of pages that are more recently accessed than pages whose respective addresses are cached in the second level. The memory controller comprising logic circuitry to inform system software that: a) a first page in the first cache that is accessed less than other pages in the first cache is a candidate for migration from the far memory to the near memory; and/or, b) a second page whose address travels a threshold number of round trips between the first and second levels of the second cache is a candidate for migration from the far memory to the near memory.

20 Claims, 5 Drawing Sheets

(51) Int. Cl.

| | |
|---|---|
| *G06F 11/30* | (2006.01) |
| *G06F 12/02* | (2006.01) |
| *G06F 12/0811* | (2016.01) |
| *G06F 12/0882* | (2016.01) |
| *G06F 12/1027* | (2016.01) |

(52) U.S. Cl.
CPC ...... *G06F 12/0292* (2013.01); *G06F 12/0882*
(2013.01); *G06F 12/1027* (2013.01)

(58) Field of Classification Search
CPC ............. G06F 12/1027; G06F 12/0895; G06F
11/3471; G06F 2201/885; G06F 12/0897;
G06F 12/122; G06F 12/123; G06F
12/0868; G06F 12/0804; G06F 12/0238;
G06F 2201/88; G06F 2212/1016; G06F
2212/1021; G06F 2212/205; G06F
2212/282; G06F 2212/283; G06F
2212/3042; G06F 2212/502; G06F
2212/683; G06F 3/0647; G06F 3/065;
G06F 3/0683
USPC ......................................................... 711/154
See application file for complete search history.

(56) References Cited

U.S. PATENT DOCUMENTS

| | | | | |
|---|---|---|---|---|
| 2012/0042033 A1* | 2/2012 | Ayala, Jr. | .............. | G06F 9/4856 |
| | | | | 709/216 |
| 2012/0221785 A1* | 8/2012 | Chung | ................ | G06F 12/0893 |
| | | | | 711/E12.078 |
| 2014/0156935 A1* | 6/2014 | Raikin | ................ | G06F 12/0646 |
| | | | | 711/170 |
| 2014/0297919 A1* | 10/2014 | Nachimuthu | ....... | G06F 12/0804 |
| | | | | 711/102 |
| 2015/0149730 A1 | 5/2015 | Hu et al. | | |
| 2018/0189202 A1* | 7/2018 | Yap | ..................... | G06F 13/4068 |
| 2018/0260323 A1 | 9/2018 | John et al. | | |
| 2019/0370187 A1 | 12/2019 | Yu et al. | | |

OTHER PUBLICATIONS

Jiang, et. al., CHOP-Adaptive Filter-Based DRAM Caching for
CMP Server Platforms, High Performance Computer Architecture
(HPCA), 2010 IEEE 16th International Symposium on IEEE, Jan.
9, 2010, pp. 1-12.

* cited by examiner

Cache Slot in FM Address Cache

| Address | Round Trip Counter | Bit Vector 301 | Cache Line Counter 302 |
|---|---|---|---|

Fig. 3

APPARATUS AND METHOD FOR EFFICIENT MANAGEMENT OF MULTI-LEVEL MEMORY

FIELD OF INVENTION

The field of invention pertains generally to the computing sciences, and, more specifically, to an apparatus and method for efficient management of a multi-level memory.

BACKGROUND

With the advent of "big data", cloud/centric computing, artificial intelligence and other computationally intensive computing environments, computer system and component designers are seeking ways to improve memory performance. Here, computationally intensive computing operations commonly access large amounts of data in memory. As such, the ability to store more information in memory coupled with the ability to access that information quickly would greatly improve the performance of a computing system that operates in a computationally intensive environment.

FIGURES

A better understanding of the present invention can be obtained from the following detailed description in conjunction with the following drawings, in which:

FIG. 3 shows an embodiment of an entry in an address cache;

DETAILED DESCRIPTION

Multi-Level Main Memory with a Far Memory (FM) Cache

Figure 1:
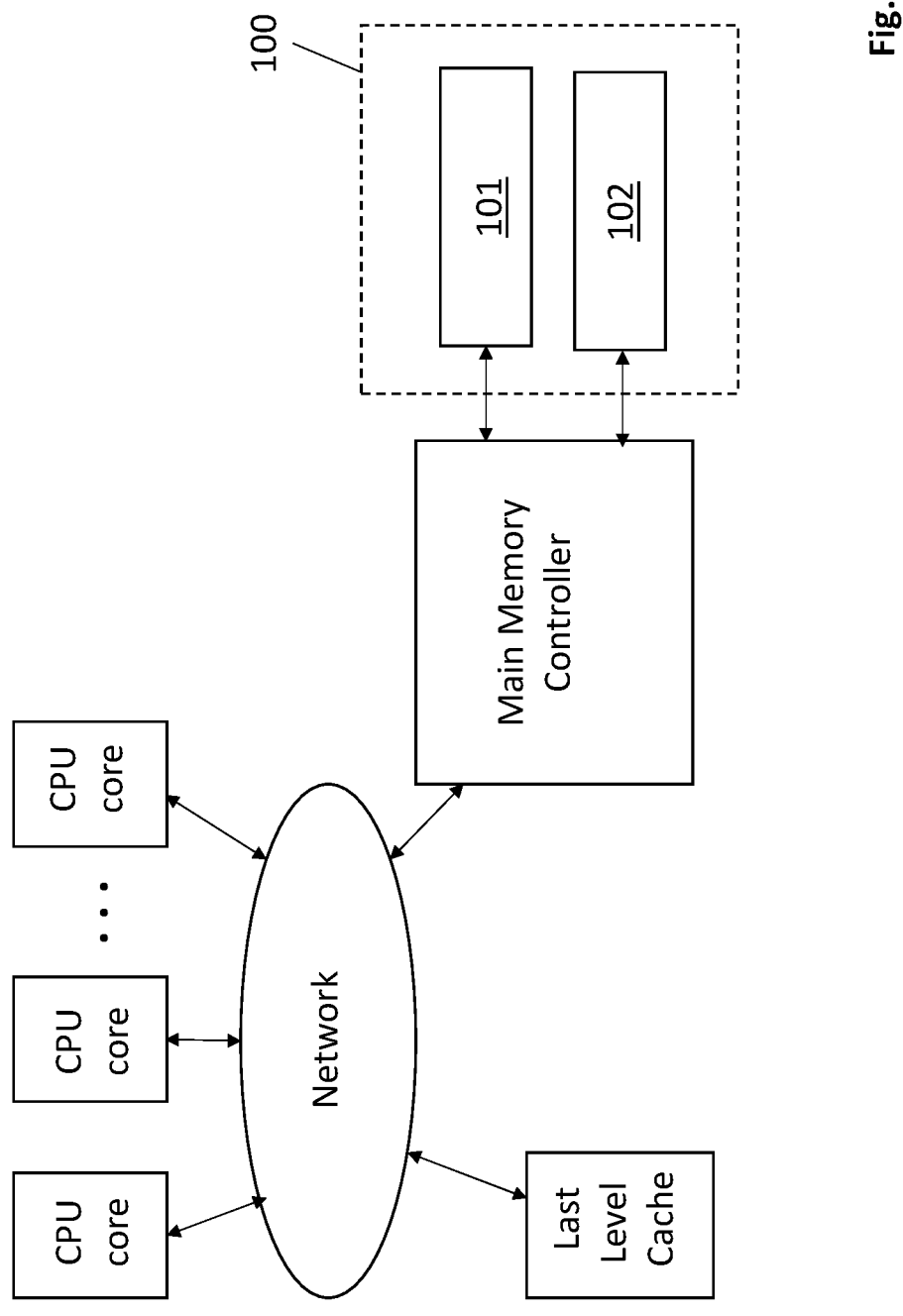
FIG. 1 shows a multi-level main memory.

FIG. 1 depicts a multi-level main memory 100. As observed in Fig. Z, the multi-level main memory 100 includes a first level 101 and a second level 102, where, the first level 101 is characterized as being volatile and having smaller access times, at least for write operations, than the second level 102. The second level 102 is characterized as having longer access times, at least for write operations, than the first level 101 and being non volatile.

In various embodiments, both levels 101, 102 have respective address space that an operating system, operating system instance and/or virtual machine monitor (hereinafter, "system software") is able to allocate (e.g., to various software applications that execute on a computing system having the multi-level main memory). As is understood in the art, main memory is organized by assigning a unique physical address in main memory for each page of information (instructions or data) that an application uses when executing out of main memory 100.

Ideally, system software is able to allocate main memory address space so that the most frequently accessed pages reside in the first level 101 (hereinafter, "near memory") and less frequently accessed pages reside in the second level 102 (hereinafter, "far memory").

Although system software generally desires to allocate the most frequently accessed pages in near memory, system software often has little or no understanding of which pages are, in fact, most frequently accessed during runtime. Here, particularly in distributed systems where multiple applications have access to a same region of main memory (and therefore have access to the same pages), system software cannot determine (in any efficient way) which pages are "hot" and which pages are "cold".

Figure 2:
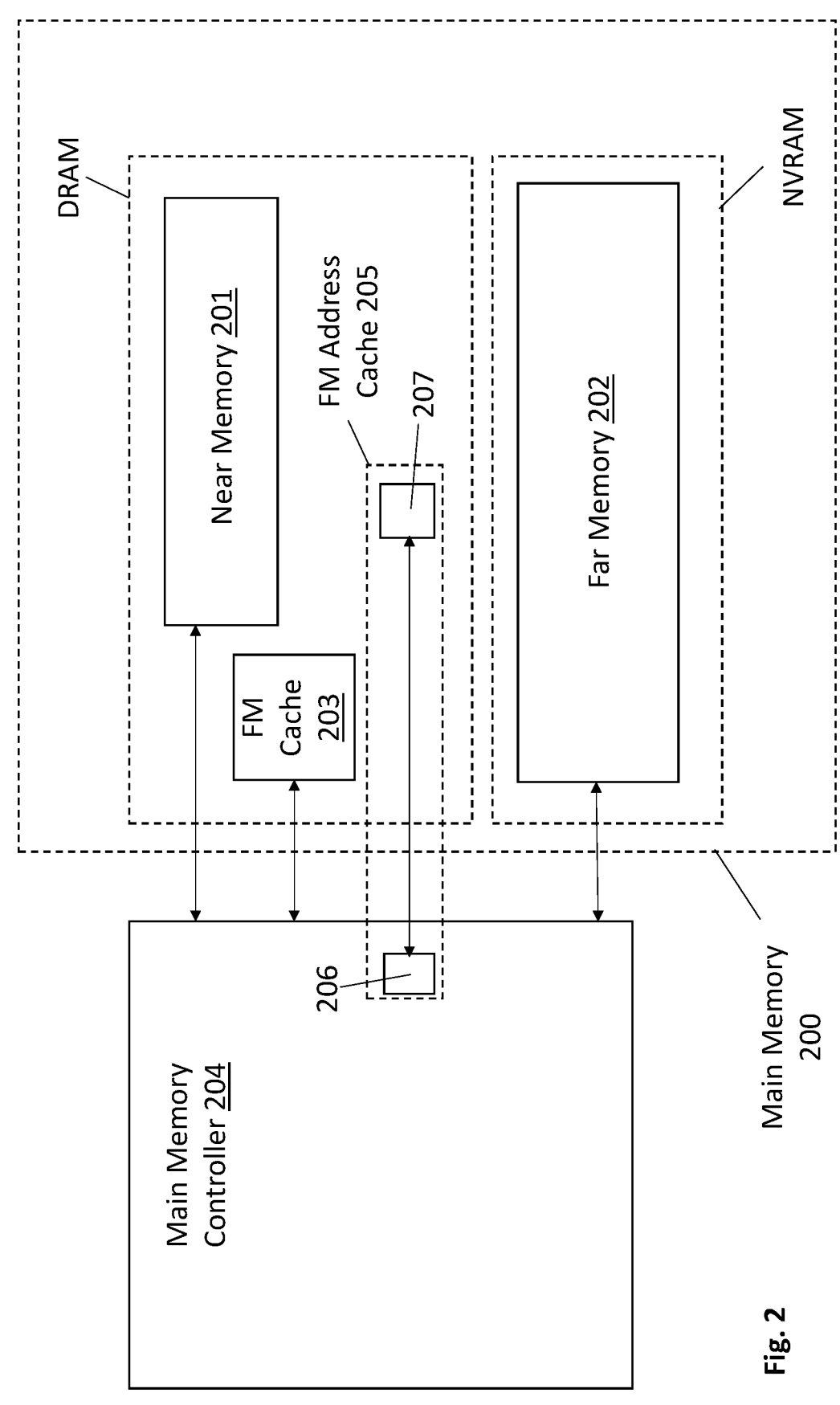
FIG. 2 shows a memory controller coupled to a multi-level memory.

As such, as observed in FIG. 2, the multi-level main memory implementation 200 also includes a far memory (FM) cache 203 that stores far memory's most recently accessed pages. In various embodiments, the FM cache 203 is implemented with a special reserved portion of the DRAM memory resources that are used to implement near memory 201. For example, a subset of the physical address space of the DRAM memory modules used to implement near memory 201 is reserved for the FM cache 203 rather than being allocable by system software as main memory address space. Far memory 202, as explained in more detail further below, can be implemented with an emerging, three-dimensional (stacked) non volatile memory cell technology (non volatile random access memory (NVRAM)) that is capable of supporting byte addressable memory addresses.

According to the implementation of FIG. 2, upon the main memory controller's reception of a request whose target address maps to a page in far memory 202, the memory controller hardware is designed to first look to the FM cache 203 for the page that contains the cache line targeted by the request. If the page is present in the FM cache 203 (cache hit), the request is serviced from the FM cache 203. If the page is not present in the FM cache 203 (cache miss), the page is called up from far memory 202, the request is serviced from the page, and the page is written into the FM cache 203.

Here, an address cache 205 is used to determine whether or not the page that is targeted by a request is in the FM cache 203. The address cache 205 lists the far memory addresses of those pages that are in the FM cache, and, for each such page, also identifies the address in the FM cache 203 where the page is located. Thus, upon receiving a far memory access request, the main memory controller 204 first looks into the address cache 205 to see if it contains a far memory page address that matches the page portion of the request's address. If so, there is a hit in the FM cache 203 and the memory controller uses the FM cache address that was listed in the address cache 205 for the far memory/request address to access the targeted cache line in the FM cache 203 to service the request.

If the page portion of the request's address does not match any of the far memory page addresses in the address cache 205, there is a cache miss and the request is serviced from far memory 202. According to various embodiments, the targeted page is copied into the FM cache 203, and, the address cache 205 is updated to include the address of the page and its corresponding address in the FM cache 203. If the insertion of the page into the FM cache 203 causes the eviction of another page from the FM cache 203 (in which case the evicted page is written back to far memory if it is dirty), the address of the other page is marked invalid or deleted from the address cache 205.

As observed in FIG. 2, the address cache 205 includes two levels 206, 207. The first level is a smaller cache that resides on the same semiconductor chip as the memory controller 204. The second level 207 is a larger cache that is implemented with a reserved portion of the DRAM memory space similar to the FM cache 203. The number of entries in the address cache 205 (the combined number of entries in both cache levels 206, 207) is at least equal to the number of entries in the FM cache 203 and can be larger than the number of entries in the FM cache 203. More details about the operation of the address cache 205 and the first and second levels 206, 207 are provided in more detail further below.

In various embodiments, the FM cache 203 and the address cache 205 are both implemented as set associative caches having multiple sets. Each set includes a number of cache slots that a page (in the case of the FM cache 203) or address mapping (in the case of the address cache 205) can be inserted into. Each far memory 202 page address maps to a particular one of the sets in the respective caches 203, 205 and can be entered in any of the set's slots.

With respect to the far memory cache 203, when the set that a far memory request maps to is full, a cache miss of the request will result in a page being evicted from the set in the FM cache 203 and written back into far memory 202 (if it is dirty) in order to make room in the set for the page that is called up from far memory 202 to service the request that just suffered the cache miss.

According to one embodiment, each of the slots in a set has a most recently used (MRU) meta data bit. In the case of a cache hit, that is, when the page identifier portion of a request address matches that of a page held in one of the slots of the set that the request address maps to, the MRU bit is asserted (to a 1) if it is presently not asserted. If the MRU bit is already asserted it remains asserted.

If there is a cache miss, the memory controller hardware selects one of the slots in the set whose MRU bit is not asserted and evicts that slot's page from the FM cache 203 back to far memory 202 if the page is dirty (if the page is not dirty, it is not written back to far memory 202).

MRU bits of a set are flipped back to non asserted status (e.g., 0) when only one of the slots in the set has its MRU bit not asserted and there is an access to that slot. The access can be based on a cache hit or a cache miss. If there is a cache hit to the slot, the MRU bit is asserted for the slot and the MRU bits of all the other slots in the set are flipped back to non asserted status. If there is a cache miss, the slot's page must be chosen for eviction. The new page called up from far memory 202 to service the request replaces the page in the slot, the MRU bit of the slot is asserted and the MRU bit of all the other slots in the set are flipped back to non asserted status.

This particular caching algorithm works well when pages receive high rates of access in short bursts of time. In this case, after a page is first placed in the FM cache 203 it then receives a high rate of accesses which are serviced from the FM cache 203. After a relatively brief runtime, the high rate of accesses to the page can drop and the page is eventually evicted back to far memory 202. It can be said that the FM cache 203 serves such pages well because the accesses to these pages are substantially serviced from the FM cache 203.

Identifying Hot Pages that are Least Frequently Used in the FM Cache

An access pattern that does not fit this model is a page that receives large numbers of access that are spread out over an extended period of time. Here, the page is regularly accessed but not at a rate that is sufficient to keep it in the FM cache 203 for long periods of time. In the case of such pages, after the page is entered in the FM cache 203, it may receive only a few accesses before it is eventually evicted back to far memory 202. Subsequently, after eviction, the page receives another access which causes it to be re-entered in the FM cache 203 only to have it evicted again from the FM cache

203 shortly thereafter because it had few accesses while in the FM cache 203. This general pattern then repeats over extended runtimes.

According to this pattern, the FM cache 203 does not serve the page in a meaningful way (few accesses are made to the page while it is in the FM cache 203). Such pages are therefore good candidates for promotion from far memory 202 to near memory 201. That is, even though such pages are not served well by the FM cache 203, they are nevertheless frequently accessed pages that deserve the faster access of near memory 201 rather than the slower accesses of far memory 202. As such, system software should change the page's memory allocation from a far memory 202 address to a near memory 201 address.

In order for the migration to actually happen, however, the memory controller 204 needs to have a mechanism for identifying pages that demonstrate some indicia of being regularly accessed over extended periods of time, but not at rates that keep the pages in FM cache 203 in time to service the accesses the receive from the FM cache 203.

According to one embodiment, the meta data of each cache slot is therefore extended to include a "hot bit" along with the MRU bit. If a page receives a hit while it is in the FM cache 203 and its MRU bit is not asserted, and the page is the only page in the set or one of a few pages left in the set whose MRU bit is not yet asserted, the page's "hot bit" is asserted.

Here, the fact that the page is the only page in the set, or one of the few pages in the set, that do not yet have its MRU bit asserted means that the page does not receive accesses as rapidly as a majority of other pages in the set. At the same time, the fact that the page eventually did receive a hit while in the FM cache 203 means that the page could be expected to receive larger numbers of accesses than other pages in far memory 202—thereby justifying its migration up to near memory 201. In various embodiments, the trigger for setting the hot bit according to the above described algorithm is when the percentage of pages in a set that do not have their MRU bit asserted is less than 34% (e.g., 33%, 25%, etc.). Other percentages are possible.

After a page's hot bit is asserted, if the page subsequently receives another hit while in the FM cache 203, the memory controller 204 takes affirmative action to notify system software of the existence of the hot page. According to one embodiment, if the next FM cache hit for the page is a read or write request, system software is notified of the hot bit assertion by way of the returned read or write response (the response message to the requesting CPU core that (which includes read data in the case of a read request) indicates the targeted cache line's page had its hot bit asserted). System software can then observe the read or write response and understand that the page having the cache line that was targeted by the read or write had its hot bit asserted. System software can then decide if it wants to re-allocate the page from far memory 202 to near memory 201.

According to other embodiments, the memory controller 204 can raise an interrupt to system software when a page has its hot bit asserted and/or update register space that identifies page(s) (by address) with an asserted hot bit. System software can read the register space (in response to the interrupt or periodically) and then determine to migrate any such pages up from far memory 202 to near memory 201.

In another embodiments, the memory controller 204 can update a memory data structure with the address of the identified hot page and raise an interrupt to system software when a single page or a group of several pages are identified as hot pages. System software can read the memory data structure that holds identified hot pages information (in response to the interrupt or periodically) and then determine to migrate any such pages up from far memory 202 to near memory 201.

Identifying Hot Pages that have Short Lifetimes in the FM Cache

Although the above described approach works well for pages that are accessed frequently enough to experience more than one hit while in the FM cache 203, there are still other far memory pages that receive accesses frequently enough to justify promotion to near memory 201 but still do not receive accesses frequently enough to remain in the FM cache 203 for more than one cache hit.

That is, such pages may receive one access or no accesses after being placed in FM cache 203 resulting in their eviction from FM cache 203 without having their hot bit asserted (according to the above described process). Nevertheless, shortly after eviction from FM cache 203, these pages may again receive another access resulting in their placement back into the FM cache 203. Thereafter, again, these pages do not receive enough accesses to have their hot bit asserted before their eviction from FM cache 203. The process then repeats with the pages thrashing between far memory 202 and the FM cache 203 with little or no benefit of being placed in the FM cache 203.

In short, the access frequency of such pages, although frequent enough to justify promotion to near memory 201, is longer than the page's lifetime in FM cache 203 which prevents the page being assigned a hot bit according to the above described algorithm. Such pages will not be promoted to near memory 201 therefore if the system only uses the above described MRU hot bit approach for identifying pages that justify promotion up to near memory.

As discussed above, the address cache 205 keeps mappings of a far memory page address to a FM cache page address. Here, keeping just the address mappings and not page data keeps the footprint of the address cache 205 small relative to the size of the FM cache 203.

Apart from the mappings used to perform look-ups into the FM cache 203, the address cache 205 can also be viewed as a history of the far memory's most recently accessed pages. As mentioned above, the total number of entries in the address cache 205 (the number of addresses it holds), is at least the same as the FM cache but can even be much larger than the number of entries in the FM cache 203 (but, again, because the FM cache 203 stores the data of the pages (e.g., at 4 kB per page) and the address cache 205 only stores addresses, the size of the address cache 205 is much smaller than the FM cache 203). If the number of entries in the address cache 205 is made greater than the number of entries in the FM cache 203, it allows the address cache 205 to provide a much deeper history of recent page accesses than the FM cache 203. If the number of entries in the address cache 205 is made greater than the number of entries in the FM cache, the entries in the address cache 205 should include a bit that indicates whether or not the corresponding page is actually in the FM cache 203 (for purposes of performing the FM cache hit/miss lookup in the address cache 205). The bit is therefore set in an entry of the address cache 205 when the entry is populated with a mapping for a page that is freshly being entered in the FM cache 203, and, is cleared when the page is evicted from FM cache 203. For the sake of example, the following discussion will assume that the number of entries in the address cache 205 is significantly larger than the number of entries in the FM cache 203.

As mentioned above, the address cache 205 includes two levels: 1) a first level 206 that is on the same chip as the memory controller 204; and, 2) a second level 207 that is kept in another reserved portion of the DRAM memory resources (akin to the FM cache 203).

When a page in far memory 202 is accessed, its address is moved into the first level 206 if it is not already there. This can include moving the address from the second level 207 (if it is there) to the first level 206, or, freshly entering the address into the first level 206 if it is not in either the first or second levels 206, 207.

As such, in terms of recent history, the addresses of the most frequently accessed far memory pages will dominate the population of the first level 206. By contrast, the addresses of the least frequently accessed far memory pages will have trouble staying even within the second level 207 (the total number of slots in the address cache 205 is still less than the total number of page addresses in far memory 202).

Hot pages are identified by tracking, for each address in the address cache 205, the number of "round trips" an address has taken thrashing between the first and second caching levels 206, 207. Here, the caching slots of address cache 205 each include space for a page address and a counter value that counts how many round trips the corresponding page has traversed between the first and second levels 206, 207 of the address cache 206 (an address's counter follows its address as it changes levels).

Here, upon a page being first accessed from far memory 202, its address is placed in the first level 206 as described above and its round trip counter is set to 0. If the page is not accessed at high rapidity, its address is eventually evicted from the first level 206 and entered in the second level 207. While the page's address is in the second level 206, however, the page may be again accessed in which case its address is moved back up from the second level 207 to the first level 206. In this case the page has undergone one round trip between levels and its round trip counter is incremented by one.

For the types of pages being looked for, the round trip counter will increment a number of times. Such pages are characterized as not being accessed enough to have their address remain in the first level, 206 but, are accessed sufficiently enough to remain in the address cache 205 (either first or second levels) for extended periods of time without being evicted from the second level 207. As such, according to various embodiments, after a page's round trip counter has reached some threshold value, the page is declared a hot page.

The specific threshold can depend on the relative size of the address cache 205 to the total number of far memory addresses and/or the relative sizes of the first and second caching levels 206, 207. The manner in which system software is notified of a page being declared hot can be any/all of those discussed above. As describe above, once system software is notified that a page is declared hot, it may choose to migrate the page up to near memory 201 from far memory 202.

In various embodiments, the FM address cache 205 alongside its on-die address cache 206 and off-die address cache 207 may be used only for the purpose of access pattern history, avoiding actual caching in FM cache. In such embodiments, the FM cache size will be set to '0. For example, such embodiments may be used in platforms where the FM access latency and/or bandwidth are sufficiently close to near memory access latency and/or bandwidth. Such embodiments may also be used in platforms that are characterized by workloads with sparse traffic patterns, where caching a full page in the FM cache 203 due to a memory reference to a specific memory byte will not be desired.

In various embodiments, the memory controller 204 includes second cache management logic circuitry (not shown in FIG. 2) to manage the address cache 205. In an embodiment, the address cache is a set-associative cache having more sets and/or more ways than the FM cache 203 to effect, as described above, a deeper history/record of recent page accesses.

Identifying Hot Pages by Tracking Accesses of Constituent Cache Lines

Figure 3:
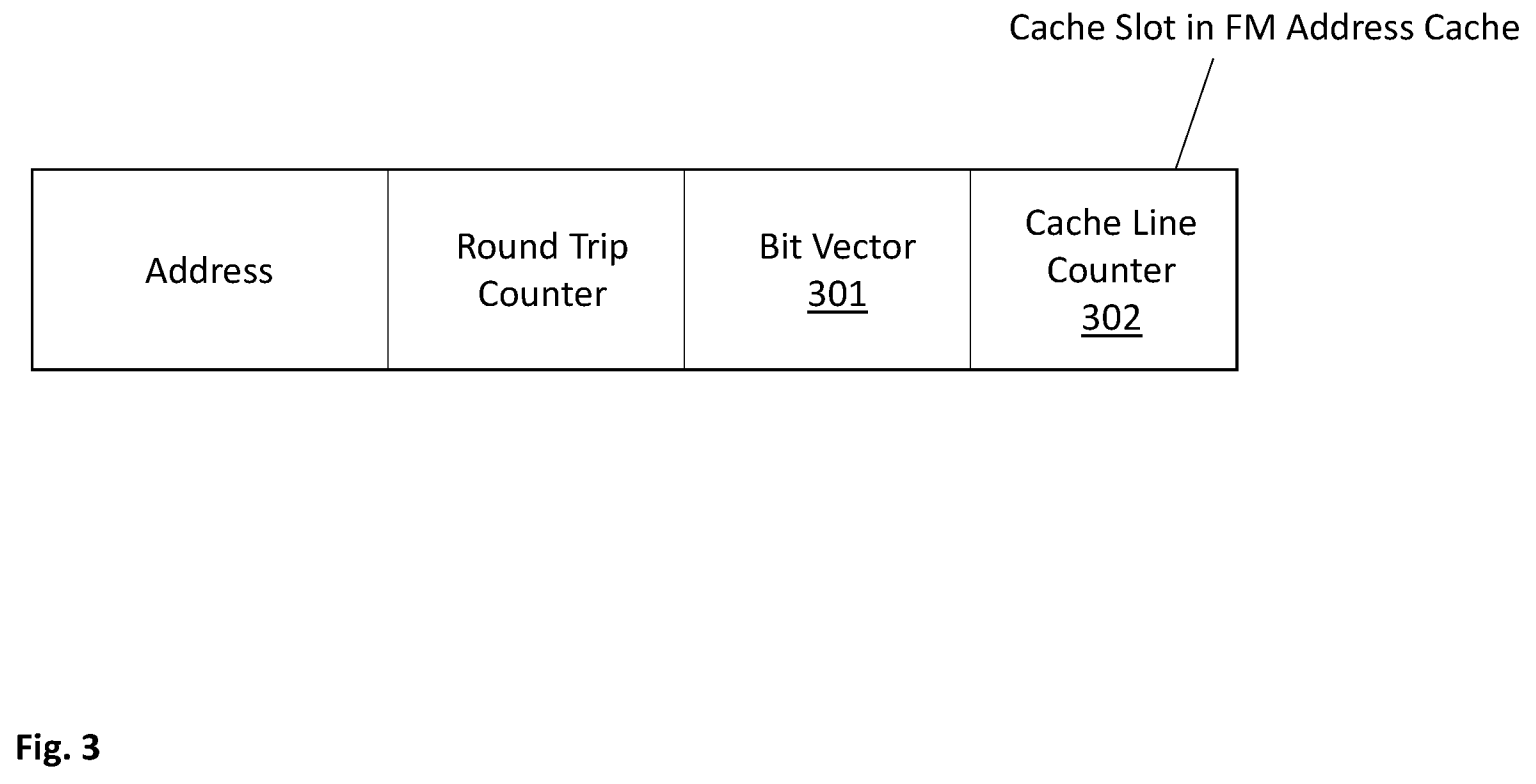

In even further embodiments, referring to FIG. 3, the slots in the address cache 205 are further enhanced to include meta data that tracks, to some extent, specific cache line accesses in their respective pages. According to the approach of FIG. 3, the additional meta data includes a bit vector 301 and a "cache line" counter 302. The bit vector 301 is a vector where each bit element of the vector corresponds to a specific cache line in the page that the slot entry corresponds to. For example, according to one embodiment, the bit vector 301 is an eight bit vector where the first bit corresponds to the $8^{th}$ cache line in the page, the second bit corresponds to the $16^{th}$ cache line in the page, . . . , and the eighth bit corresponds to the $64^{th}$ cache line in the page (where the page has 64 cache lines).

Here, the address of a memory request that is received by the memory controller 204 targets a specific cache line within a page. As such, the address identifies not only the target page but also the target cache line. As discussed above, when a page is first accessed, its address and corresponding meta data is entered in the first level cache 206 of the address cache 205. The bit vector 301 is all 0s when the entry for the page is first entered in the first level 206. If the cache line that was targeted by the access happens to be one of the cache lines that is tracked by the bit vector 301, the cache line's corresponding bit is flipped to a 1 in the bit vector 301 (e.g., if the targeted cache line is the $8^{th}$ cache line in the page, the first bit of the bit vector 301 is flipped to a 1). Otherwise, the bit vector remains all 0s.

Over time the page may get a number of accesses while the page's address sits in the address cache 205 (whether in the first or second levels 206, 207). Correspondingly, some of these accesses may target a cache line having a representative bit in the bit vector 301. Upon a first instance of an access whose targeted cache line corresponds to a bit in the bit vector 301, the value of the bit is flipped from a 0 to a 1 and the cache line counter 302 is incremented.

Upon a second instance of the same cache line being targeted (in which case the corresponding bit in the bit vector 301 has already been flipped to a 1), the page is declared a hot page. That is, when memory controller hardware attempts to update the bit for the particular cache line in the bit vector 301 and observes that the bit has already been asserted (meaning the cache line has previously been targeted while the page's address was entered in the address cache), the hardware declares the page a hot page and system software is informed of the page's new status according to any of the aforementioned techniques (and the software may choose to promote the page to near memory 201). Here, the algorithm essentially flags the page as a hot page if the page demonstrates a single cache line that demonstrates a high access rate (two accesses while the page's address is cached in the address cache 205).

It is altogether possible that instead of a single cache line being the target of two or more accesses, a number of the page's cache lines are singularly accessed. According to this particular access pattern, eventually, a number of the bits in the bit vector should be asserted (e.g., eventually the $1^{st}$, $8^{th}$, $16^{th}$, etc. cache lines will be targets of a memory request) without any of these cache lines being accessed twice.

As described above, when a cache line having a representative bit in the bit vector 301 is first accessed after the page's address has been entered in the address cache 205, the representative bit in the bit vector 301 is flipped from a 0 to a 1 and the cache line counter 302 is incremented. Thus, if a number of cache lines having representative bits in the bit vector 301 are singularly accessed, the value of the cache line counter 302 will grow. Accordingly, if the cache line counter 302 reaches some threshold, the page is declared a hot page. That is, when the memory controller 204 processes the meta data and updates the counter 302, it compares the counter value against a threshold and if the threshold is met or exceeded the memory controller 204 declares the page a hot page. Again, system software can be informed of the decision by any of the mechanisms described above and may choose to promote the page to near memory.

Note that size of the bit vector 301 can be adjusted to include more than one bit per representative cache line (e.g., so that a counter is maintained for each representative cache line) and if a threshold is exceeded (meaning the cache line has been accessed a threshold number of times)) the page can be declared hot. The size of the bit vector 301 can also be expanded to include more (than eight) representative cache lines, etc. The size of the bit vector 301 can also be based on the page size, cache line size and/or number of cache lines per page.

Persistent Flush Log

Whenever a page is migrated up to near memory 201 from far memory 202, system software causes the translation look-aside buffer (TLB) of any instruction execution pipelines(s) that execute application software program code that reads and/or writes to the page to be updated with the new physical address in near memory where the page has been migrated to. So doing causes subsequent memory requests that target cache lines on the page to correctly call out the address of the page in near memory (and not far memory).

A possible problem if system software migrates a page from far memory to near memory is that the software application that access the page believes the data on the page is being persisted in non-volatile far memory 202. Here, with far memory 202 being non volatile, some or all of the address space of far memory 202 may be recognized as "persistent memory". Certain applications may be written to "commit" data to persistent memory 202 with the architectural significance that the data, once committed to persistent memory 202, is guaranteed to be preserved (it is persisted).

If a page having persisted data is migrated up to near memory 201, it is not actually persisted because of the non volatile nature of the near memory 201. That is, for example, the software application may execute a commit instruction (or sequence of instructions such as flushing all CPU caches to fully update the page prior to commitment) with the belief that the page is in persistent memory and the commit instruction actually persists the page. But in fact, because of the migration up to near memory 201, any updates and "commitment" are directed to near memory 201 where the page actually resides which does not result in true persistence.

Figure 4:
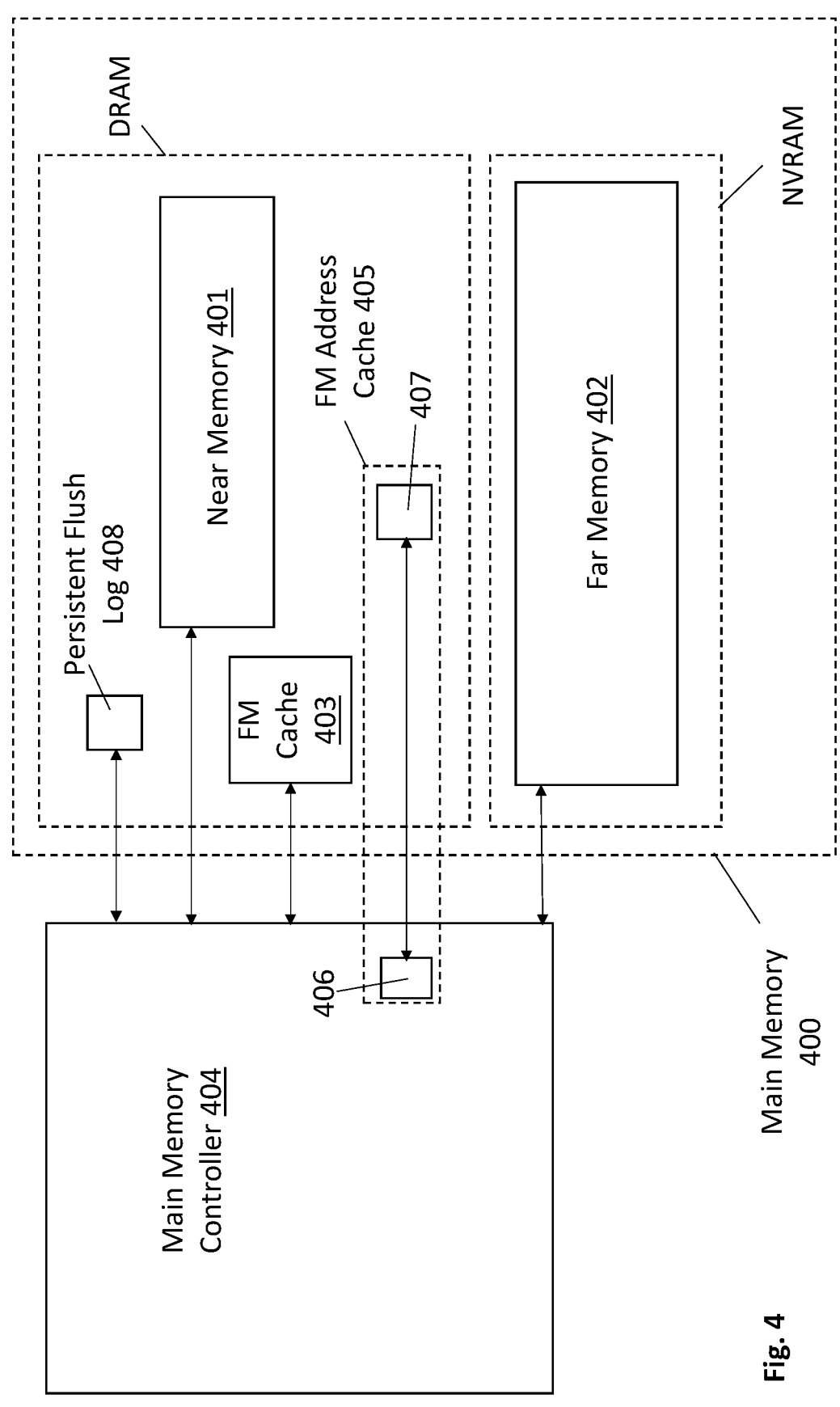
FIG. 4 shows another memory controller coupled to a multi-level memory.

As such, in various embodiments, as observed in FIG. 4, system software maintains a persistent flush log 408 in main memory 400 that identifies those pages that have been migrated up to near memory 401 from far memory 402 and have subsequently become dirty in near memory (a page becomes dirty once it is written to after being placed in near memory). According to one approach, a range of addresses in far memory 402 are understood to be persistent memory pages. If a page from the persistent memory region of far memory 402 is migrated up to near memory 401, system software creates an entry in the persistent flush log 408 that identifies the page's old far memory address and its new near memory address.

Additionally, when the page's TLB entry is updated to reflect the migration, a dirty bit is cleared in the TLB entry for the page. Thereafter, upon the first memory access instruction to write data to the page, the dirty bit in the TLB entry for the page is asserted which causes system software (e.g., by way of a trap or interrupt) to update the entry in the persistent flush log 408 for the page to reflect that the page is dirty. Periodically over the course of runtime, system software scrolls through the persistent flush log 408 and copies back all dirty pages identified in the persistent flush log 408 from near memory 401 to far memory 402.

Moreover, in the case of a power loss event or other system warning or failure, the hardware (e.g., multi-core processor having the memory controller) may be notified through an event signal. In that case, the hardware may activate a state machine that will perform the typical role of system software and copy back the pages identified in the persistent flush log 408 from near memory 401 to far memory 402.

Here, the hardware, DRAM resources of near memory and the persistent flush log and far memory may have sufficient battery back-up to support this emergency flush from near memory back to persistent memory.

Examples of emerging NVRAM technologies include Optane™ memory from Intel Corporation and QuantX™ memory from Micron corporation. NVRAM technologies commonly include stacks of storage cells that are fabricated over the semiconductor chip substrate (e.g., amongs the chip's interconnect wiring levels). Underlying NVRAM cell technologies are also often resistive in that, the store cell manifests a first logic state with a first resistance and manifests a second logic state with a second resistance. The cell's stored logical state is then detected by sensing the cell's resistance. Exemplary NVRAM storage cell technologies include phase change, ferroelectric, magnetic, dielectric, spin torque transfer magnetic, etc. Importantly, at least certain types of NVRAM can support byte addressable accesses and therefore can operate as main memory.

Additional examples of memory hierarchies include: a) a DRAM-less platform with in-package low-latency/high bandwidth embdded DRAM (EDRAM) (or ADM) used as near memory and Optane or equivalent used as far memory; b) memory that couples to a Joint Electron Device Engineering Council (JEDEC) dual data rate (DDR) specification compliant memory channel emanating from a processor serving as near memory and JEDEC graphics DDR (GDDR) or high bandwidth memory (HBM) specification compliant memory connected to a graphics processing unit (GPU) used as far memory from the processor view-point (here, far memory may be volatile or non volatile); c) HBM connected to a processor in package as near memory and DDR connected to the processor as far memory (again, far memory can be volatile or non volatile); d) a multi-socket platform with local DRAM used as near-memory and remote DRAM used as far memory (in this case, far memory is volatile); and, e) 3-level memory solutions based on HBM as near memory, DDR as middle-memory and Optane™ or equivalent memory as far memory. Various combinations of the above memory topologies and configurations may also co-exist simultaneously in a given platform.

Figure 5:
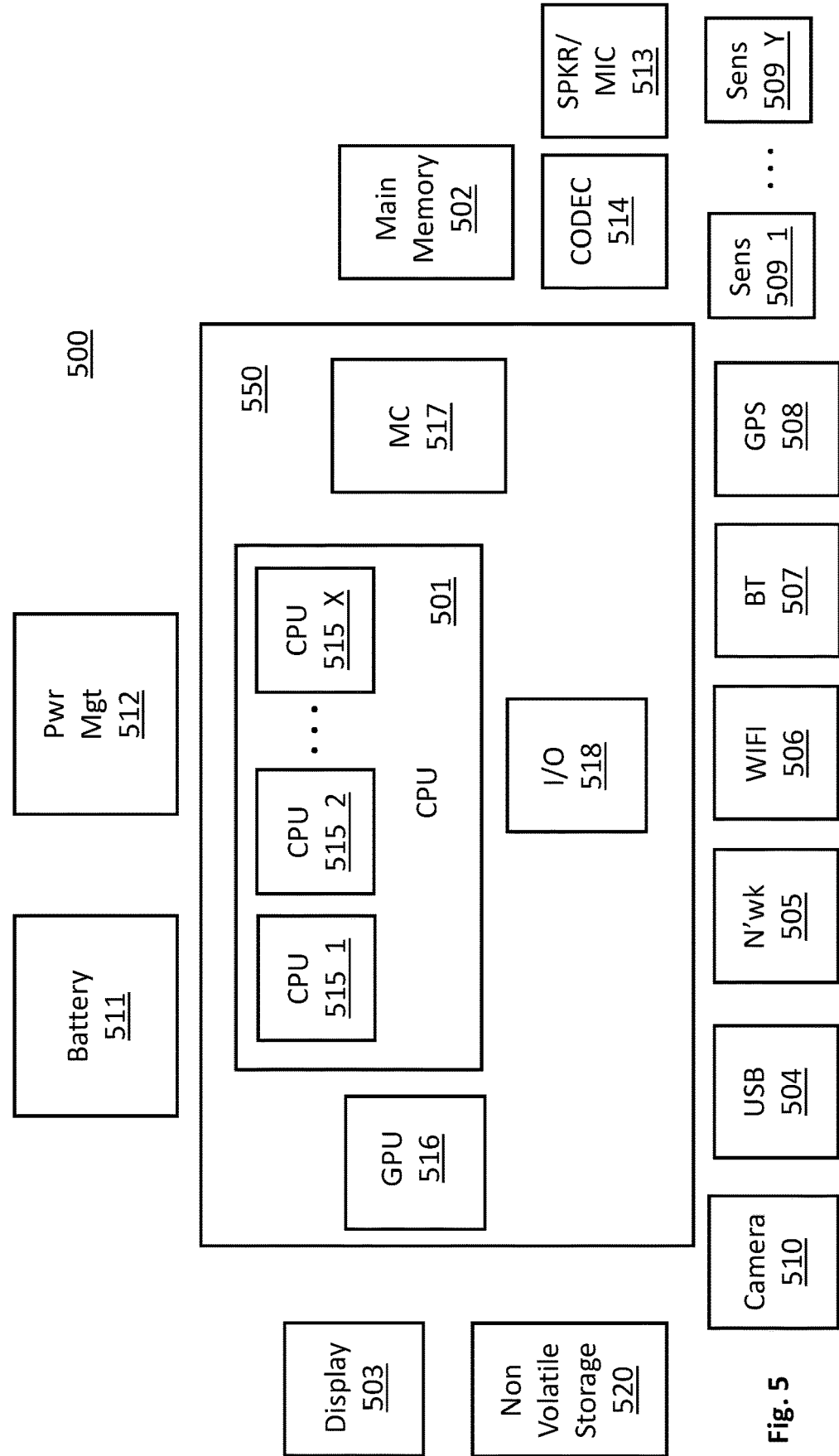
FIG. 5 shows a computing system.

FIG. 5 provides an exemplary depiction of a computing system 500 (e.g., a smartphone, a tablet computer, a laptop computer, a desktop computer, a server computer, etc.). As observed in FIG. 5, the basic computing system 500 may include a central processing unit 501 (which may include, e.g., a plurality of general-purpose processing cores 515_1 through 515_X) and the main memory controller 517 disposed on a multi-core processor or applications processor, main memory (also referred to as "system memory") 502, a display 503 (e.g., touchscreen, flat-panel), a local wired point-to-point link (e.g., USB) interface 504, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_Y, one or more cameras 510, a battery 511, a power management control unit 512, a speaker and microphone 513 and an audio coder/decoder 514.

An application processor or multi-core processor system-on-chip 550 may include one or more general-purpose processing cores 515 within its CPU 501, one or more graphical processing units 516, a memory management function 517 (e.g., main memory controller) and an I/O control function 518. The general-purpose processing cores 515 typically execute the system and application software of the computing system. The graphics processing unit 516 typically executes graphics intensive functions to, e.g., generate graphics information that is presented on the display 503.

The memory control function 517 interfaces with the main memory 502 to write/read data to/from main memory 502. Main memory 502 can be a multi-level memory as described above. The main memory controller 517 can include logic circuitry to perform any of the functions described at length above.

Non volatile mass storage 520 can be composed of solid state drives (SSDs) or other mass storage devices that are coupled to the peripheral control hub 518. In some cases, NVRAM technology is used as mass storage 520 and can be coupled to the peripheral control hub 518 and/or the main memory controller 517.

Each of the touchscreen display 503, the communication interfaces 504-507, the GPS interface 508, the sensors 509, the camera(s) 510, and the speaker/microphone codec 513, 514 all can be viewed as various forms of I/O (input and/or output) relative to the overall computing system including, where appropriate, an integrated peripheral device as well (e.g., the one or more cameras 510). Depending on implementation, various ones of these I/O components may be integrated on the applications processor/multi-core processor 550 or may be located off the die or outside the package of the applications processor/multi-core processor 550. The power management control unit 512 generally controls the power consumption of the system 500.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable storage medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An apparatus has been described. The apparatus includes a memory controller to interface with a multi-level memory having a near memory and a far memory. The memory controller is to maintain first and second caches. The first cache is to cache pages recently accessed from the far memory. The second cache is to cache addresses of pages recently accessed from the far memory. The second cache has a first level and a second level. The first level is to cache addresses of pages that are more recently accessed than pages whose respective addresses are cached in the second level. The memory controller is to inform system software of any of a) and b) below: a) that a first page in the first cache that is accessed less than other pages in the first cache is a candidate for migration from the far memory to the near memory; b) that a second page whose address travels a threshold number of round trips between the first and second levels of the second cache is a candidate for migration from the far memory to the near memory.

The second cache can be implemented on the same semiconductor chip as the memory controller. The memory controller can include first logic circuitry to track accesses of cache lines of the pages whose respective addresses are entered in the second cache. The memory controller can include second logic circuitry to inform system software that: a) a third page having a cache line that has been accessed more than once is a candidate for migration from the far memory to the near memory; b) a fourth page having a threshold number of cache lines that have been accessed is a candidate for migration from the far memory to the near memory.

In various embodiments, the memory controller is to maintain a log that identifies pages that were migrated from far memory to near memory and then were written to in near memory after their migration. The log can be made available to system software. Additionally, if the third page is written to after its entry into the first cache, the dirty bit can be asserted.

A computing system is described. The computing system includes a plurality of processing cores; a network interface; a multi-level main memory having a near memory and a far memory; and a main memory controller. The main memory controller is coupled to the multi-level main memory. The memory controller is to maintain first and second caches. The first cache is to cache pages recently accessed from the far memory. The second cache is to cache addresses of pages recently accessed from the far memory. The second cache has a first level and a second level. The first level is to cache addresses of pages that are more recently accessed than pages whose respective addresses are cached in the second level. The memory controller is also to inform system software of any of a) and b) below: a) that a first page in the first cache that is accessed less than other pages in the first cache is a candidate for migration from the far memory to the near memory; b) that a second page whose address travels a threshold number of round trips between the first and second levels of the second cache is a candidate for migration from the far memory to the near memory.

A machine readable storage medium containing program code that when processed by a computer causes the computer to perform a method has been described. The method includes receiving an indication from a memory controller that interfaces with a multi-level memory having a near memory and a far memory. The memory controller is to maintain first and second caches. The first cache is to cache pages recently accessed from the far memory. The second cache is to cache addresses of pages recently accessed from the far memory. The second cache has a first level and a second level. The first level is to cache addresses of pages that are more recently accessed than pages whose respective addresses are cached in the second level, the indication being any of a) and b) below: a) that a first page in the first cache that is accessed less than other pages in the first cache is a candidate for migration from the far memory to the near memory; b) that a second page whose address travels a threshold number of round trips between the first and second levels of the second cache is a candidate for migration from the far memory to the near memory.

The method further can include, in response to a) above, migrating the first page from the far memory to the near memory; in response to b) above, migrating the second page from the far memory to the near memory.

The method can include, after at least one of the first and second pages have been migrated from the far memory to the near memory, detecting that the at least one of the first and second pages has been written to and updating a log of dirty migrated pages in near memory. The method can include periodically reading pages listed in the log from near memory and copying them back to far memory. The method can include, in response to a power loss event, reading pages listed in the log from near memory and copying them back to far memory.

The method can include, commensurate with the at least one of the first and second pages being migrated from the far memory to the near memory, clearing a respective dirty bit in a respective entry of a translation look aside buffer for the at least one of the first and second pages.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a processor including an integrated memory controller to interface with a multi-level memory comprising volatile near memory comprising Dynamic Random Access Memory external to the processor and far memory comprising volatile or non-volatile memory external to the processor, the memory controller to maintain first and second caches, the first cache to cache pages recently accessed from the far memory, the memory controller to look into the first cache for pages that are mapped to the far memory before looking to the far memory for the pages that are mapped to the far memory, the second cache to cache addresses of pages recently accessed from the far memory, the second cache having a first level and a second level, the first level to cache addresses of pages that are more recently accessed than pages whose respective addresses are cached in the second level, the memory controller to inform system software of either or both of a) and b) below:

a) that a first page in the first cache that is accessed less than other pages in the first cache is a candidate for migration from the far memory to the near memory;

b) that a second page whose address travels a threshold number of round trips between the first and second levels of the second cache is a candidate for migration from the far memory to the near memory.

2. The apparatus of claim 1 wherein the first level of the second cache is implemented on the same semiconductor chip as the memory controller.

3. The apparatus of claim 1 wherein the memory controller includes first logic circuitry to track accesses of cache lines of the pages whose respective addresses are entered in the second cache.

4. The apparatus of claim 3 wherein the memory controller comprises second logic circuitry to inform system software at least one of:

a) a third page having a cache line that has been accessed more than once is a candidate for migration from the far memory to the near memory; and b) a fourth page having a threshold number of cache lines that have been accessed is a candidate for migration from the far memory to the near memory.

5. The apparatus of claim 1 wherein the memory controller is to maintain a log that identifies pages that were migrated from far memory to near memory and then were written to in near memory after their migration.

6. The apparatus of claim 1 wherein, the memory controller includes first logic circuitry to track accesses of cache lines of the pages whose respective addresses are entered in the second cache and second logic circuitry to inform system software that a third page having a cache line that has been accessed more than once is a candidate for migration from the far memory to the near memory, wherein, if the third page is written to after its entry into the first cache, a dirty bit for the page is asserted.

7. The apparatus of claim 1 wherein the far memory comprises Non-Volatile Random Access Memory (NVRAM).

8. A computing system, comprising:

a multi-level main memory comprising volatile near memory and far memory comprising volatile or non-volatile memory;

a processor, external to the multi-level main memory and including, a plurality of processing cores; and an integrated memory controller coupled to the multi-level main memory, the memory controller to maintain first and second caches, the first cache to cache pages recently accessed from the far memory, the second cache to cache addresses of pages recently accessed from the far memory, the memory controller to look into the first cache for pages that are mapped to the far memory before looking to the far memory for the pages that are mapped to the far memory, the second cache having a first level and a second level, the first level to cache addresses of pages that are more recently accessed than pages whose respective addresses are cached in the second level, the memory controller to inform system software of either or both of a) and b) below:

a) that a first page in the first cache that is accessed less than other pages in the first cache is a candidate for migration from the far memory to the near memory;

b) that a second page whose address travels a threshold number of round trips between the first and second levels of the second cache is a candidate for migration from the far memory to the near memory.

9. The computing system of claim 8 wherein the first level of the second cache is implemented on the same semiconductor chip as the memory controller.

10. The computing system of claim 8 wherein the memory controller includes first logic circuitry to track accesses of cache lines of the pages whose respective addresses are entered in the second cache.

11. The computing system of claim 10 wherein the memory controller comprises second logic circuitry to inform system software at least one of:

a) a third page having a cache line that has been accessed more than once is a candidate for migration from the far memory to the near memory; and b) a fourth page having a threshold number of cache lines that have been accessed is a candidate for migration from the far memory to the near memory.

12. The computing system of claim 8 wherein the memory controller is to maintain a log that identifies pages that were migrated from far memory to near memory and then were written to in near memory after their migration.

13. The computing system of claim 8 wherein, the memory controller includes first logic circuitry to track accesses of cache lines of the pages whose respective addresses are entered in the second cache and second logic circuitry to inform system software that a third page having a cache line that has been accessed more than once is a candidate for migration from the far memory to the near memory, wherein, if the third page is written to after its entry into the first cache, a dirty bit for the page is asserted.

14. The computing system of claim 8 wherein the far memory comprises Non-Volatile Random Access Memory (NVRAM).

15. A non-transitory machine readable storage medium containing program code that when processed by a computer causes the computer to perform a method, comprising:

receiving an indication from a memory controller integrated on a chip that interfaces with a multi-level memory comprising volatile near memory external to the chip and far memory comprising volatile or non-volatile memory external to the chip, the memory controller to maintain first and second caches, the first cache to cache pages recently accessed from the far memory, the memory controller to look into the first cache for pages that are mapped to the far memory before looking to the far memory for the pages that are mapped to the far memory, the second cache to cache addresses of pages recently accessed from the far memory, the second cache having a first level and a second level, the first level to cache addresses of pages that are more recently accessed than pages whose respective addresses are cached in the second level, the indication being any of a) and b) below:

a) that a first page in the first cache that is accessed less than other pages in the first cache is a candidate for migration from the far memory to the near memory;

b) that a second page whose address travels a threshold number of round trips between the first and second levels of the second cache is a candidate for migration from the far memory to the near memory.

16. The non-transitory machine readable storage medium of claim 15 wherein the method further comprises at least one of:

in response to a) above, migrating the first page from the far memory to the near memory; and in response to b) above, migrating the second page from the far memory to the near memory.

17. The non-transitory machine readable storage medium of claim 16 wherein the method further comprises, after at least one of the first and second pages have been migrated from the far memory to the near memory, detecting that the at least one of the first and second pages has been written to and updating a log, wherein, the log tracks migrated pages in near memory that are dirty.

18. The non-transitory machine readable storage medium of claim 17 wherein the method further comprises periodically reading pages listed in the log from near memory and copying them back to far memory.

19. The non-transitory machine readable medium of claim 17 wherein the method further comprises, in response to a power loss event, reading pages listed in the log from near memory and copying them back to far memory.

20. The non-transitory machine readable medium of claim 19 wherein the method further comprises, commensurate with the at least one of the first and second pages being migrated from the far memory to the near memory, clearing a respective dirty bit in a respective entry of a translation look aside buffer for the at least one of the first and second pages.

\*  \*  \*  \*  \*